No. 838,442. PATENTED DEC. 11, 1906.
A. A. OSOLING.
COMPRESSED AIR RAILWAY TRAIN BRAKE.
APPLICATION FILED MAY 31, 1906.

3 SHEETS—SHEET 1.

Witnesses:
David Fisher
R. R. McElroy

Inventor:
A. A. Osoling
by Cornwell Bros
attys

No. 838,442. PATENTED DEC. 11, 1906.
A. A. OSOLING.
COMPRESSED AIR RAILWAY TRAIN BRAKE.
APPLICATION FILED MAY 31, 1906.
3 SHEETS—SHEET 2.
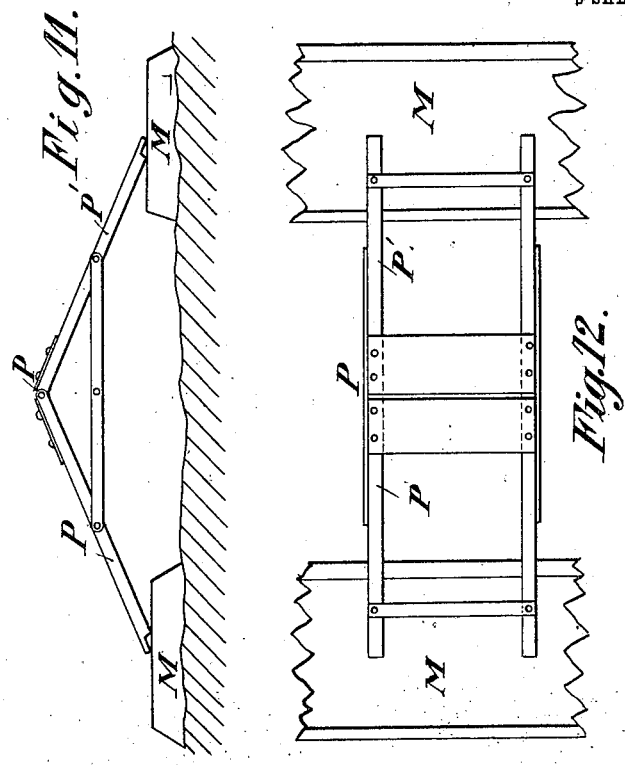
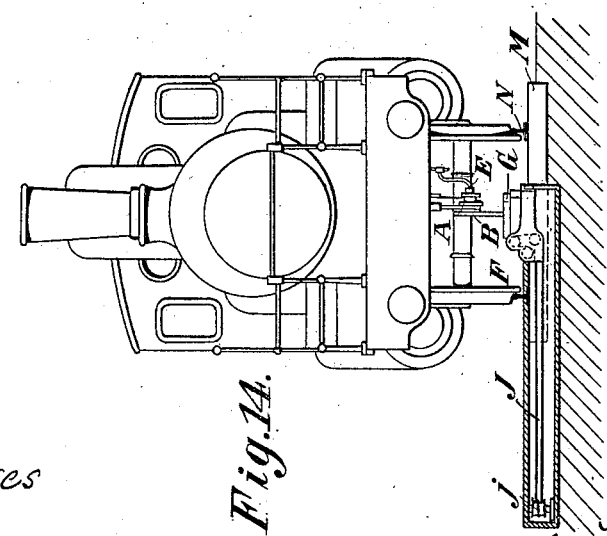
Witnesses
David Fisher
R. R. McElroy
Inventor
A. A. Osoling
by Connolly Bros.
attys
THE NORRIS PETERS CO., WASHINGTON, D. C.

No. 838,442. PATENTED DEC. 11, 1906.
A. A. OSOLING.
COMPRESSED AIR RAILWAY TRAIN BRAKE.
APPLICATION FILED MAY 31, 1906.
3 SHEETS—SHEET 3.
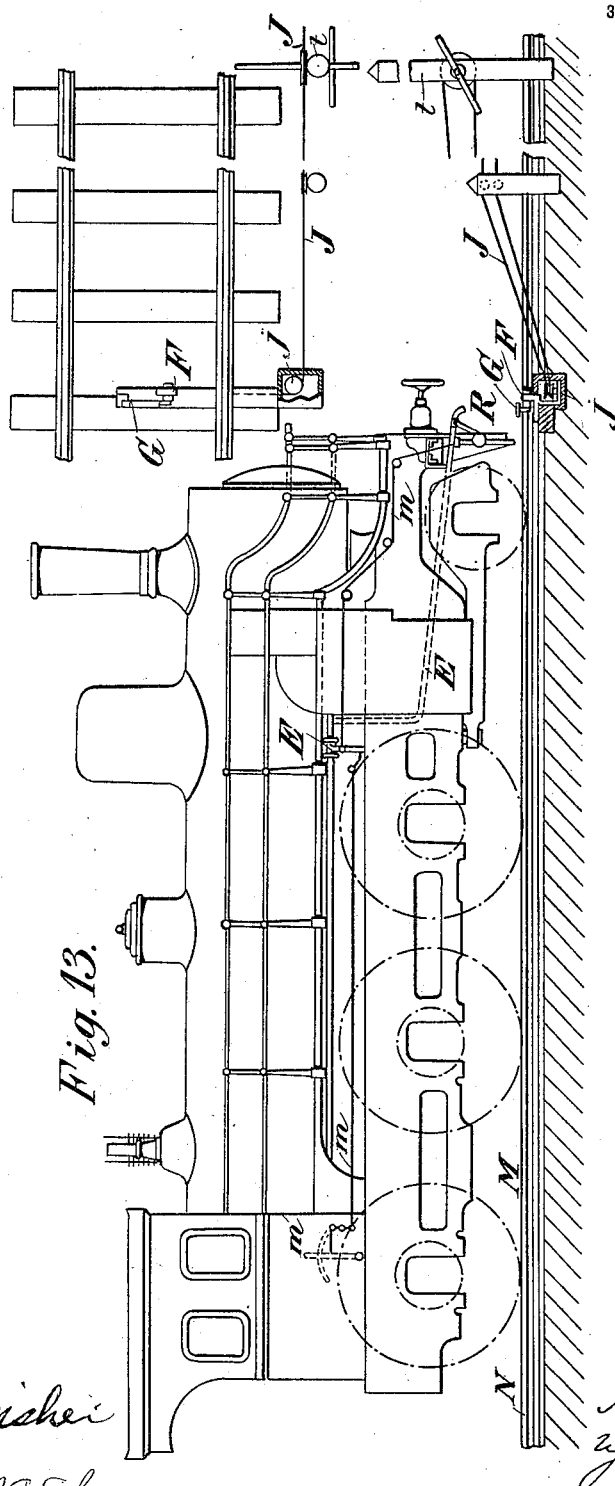

UNITED STATES PATENT OFFICE.

ADOLPH ANDREJEWITSCH OSOLING, OF ST. PETERSBURG, RUSSIA, ASSIGNOR TO OSCAR MIETENS, OF ST. PETERSBURG, RUSSIA.

COMPRESSED-AIR RAILWAY-TRAIN BRAKE.

No 838,442.　　　Specification of Letters Patent.　　　Patented Dec. 11, 1906.

Application filed May 31, 1906. Serial No. 319,601.

*To all whom it may concern:*

Be it known that I, ADOLPH ANDREJEWITSCH OSOLING, a subject of the Emperor of Russia, residing at St. Petersburg, in the Empire of Russia, have invented certain Improvements in Compressed - Air RailwayTrain Brakes, of which the following is a specification.

This invention has reference to improvements relating to compressed - air trainbrakes and means for automatically operating same from the track; and it consists, first, in an improved brake - operating device disposed on or alongside the track and, if desired, controlled in conjunction with the usual semaphore - signals, which device is adapted to actuate an air-brake-operating lever which depends or projects from the train, and, second, in improved valve mechanism for the air-brake.

In carrying my invention into practice I mount at a suitable part of the engine and so as to project therefrom an easily-operated lever, which controls the air inlet and outlet passages of the air-brake by means of a stopvalve and is adapted to be moved or rotated through a predetermined angle by the brakeoperating device or tripping on the track, all as hereinafter described. While, however, the actuation of the brake is brought about automatically, it can only be released by the engine - driver operating a separate lever, which actuates the valve-gear of the brake.

The accompanying drawings illustrate one arrangement of my apparatus.

Figure 1:
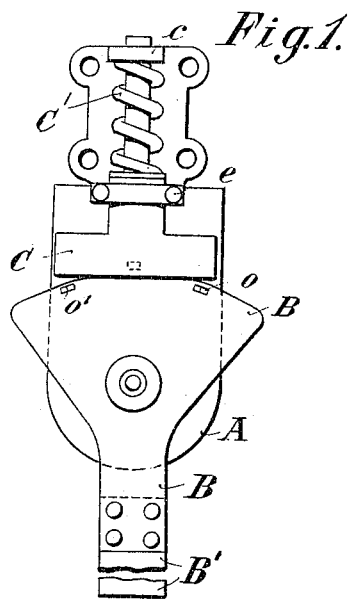
Figure 2:
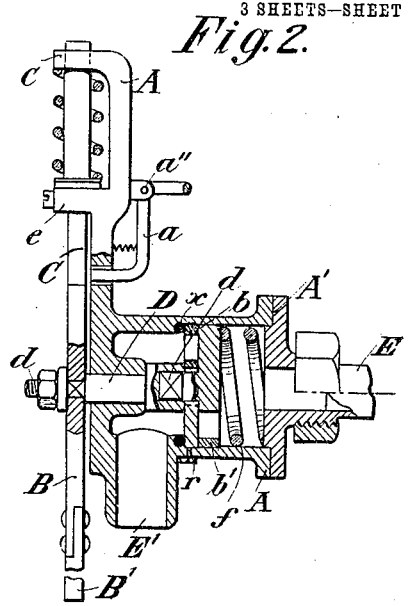
Figure 3:
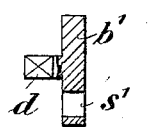
Figure 4:
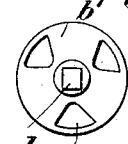
Figure 7:
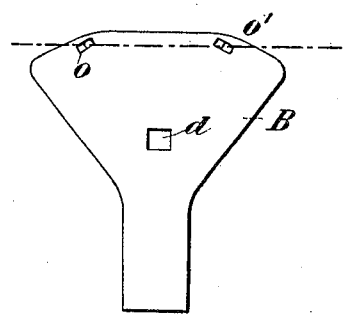
Figure 5:
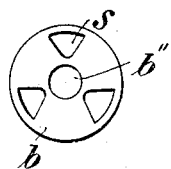
Figure 6:
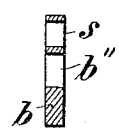
Figure 9:
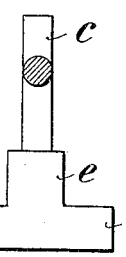
Figure 10:
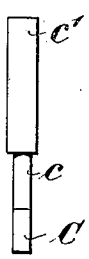
Figure 8:
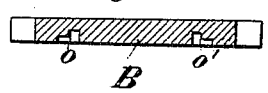

Figures 1 to 9 show the mechanism which I provide upon the engine for controlling the air-brake, Fig. 1 being a side view of and Fig. 2 a section through the brake-operating lever and the stop-valve mechanism which it controls. Figs. 3, 4, 5, and 6 show details and sections of the valve slides or disks. Fig. 7 shows separately the sector to which the operating-lever is connected. Fig. 8 is a section through the sector on line $z\,z'$ of Fig. 13, and Figs. 9 and 10 show front and side views of another detail. Figs. 11 and 12 show, respectively, side and plan views of a modification of the brake operating or tripping device disposed on the track, said device in this case being independent of the signal; and Fig. 13 is a side elevation of an engine and part of the brake-operating mechanism mounted on the track. Fig. 14 is a front elevation of an engine and in transverse section a part of the brake-operating mechanism mounted on the track. Fig. 15 is a plan view of part of the brake - operating track mechanism.

Referring to the drawings, the tripping apparatus, which is arranged between the rails and is connected with the nearest semaphore-signal, consists of metal housing F, having a bed-plate F''', and carrying a standard in which a slot F' is formed. A similar slot F'' is formed in a piece cast on the housing F.

Within the housing F, which is secured to the sleepers in any known manner, a pulley H is rotatably mounted, and a rope or the like J, which is led over said pulley, is secured thereto by means of a pin $i$. The spindle of the pulley H passes through the housing F, and a bar G is fixed on its outer end. When said pulley is rotated in one direction, the flat part of the bar G is engaged in the slots F' and F'' above referred to, and when it is rotated in the opposite direction said bar is raised out of these slots and turned over on its back. The rope J is led to the signal-post over two small guide-pulleys $h$, mounted within the housing, and like guide-pulleys $j$, rotatably mounted on the signal-post itself.

The apparatus which I mount on the engine consists, essentially, of an automatic valve and its actuating mechanism, the construction and arrangement of which are as follows: In the metal cylinder A there are two flat circular disks $b\,b'$, Figs. 3 to 6, in which sector-shaped apertures $s\,s'$ are formed. Said cylinder is hermetically closed by means of the cover A', to which the air-outlet pipe E is connected, while in front of the cylinder a T-shaped slide is mounted in guides $c$ and $e$. Said slide is pressed down by a spring C', so that it always rests upon the sector B, and it is kept from turning by the lower part of its stem and the guide $e$ being of rectangular or angular cross-section. In the sector two notches $o\,o'$ are formed, in one or other of which a pawl $a$ engages. Said pawl is acted on by a spring $a'$ and is pivoted at $a''$, while its free end is connected to a hand-lever in the cab of the engine by means of rods $m\,m'$ or equivalent means. The sector is fixedly mounted in the spindle of the valve-disk $b'$, and by its rotation the position of the latter relatively to the fixed disk $b$ is controlled, said disk $b$ being prevented from rotating by means of a set-screw $r$, which projects into the cylinder A. When the sector B is moved out of its vertical position by the actuation of the operating-lever B', when the latter strikes the bar G the apertures $s$ $s'$ are brought into alinement, so that the air which operates the brakes can pass through from the one part of the cylinder to the other. Between the disk $b$ and the shoulder of the cylinder a packing-ring $x$ is provided to insure an airtight connection, and the two disks $b$ $b'$ are pressed firmly together by means of a spring $f$. The one part of the cylinder A is connected, by means of the pipe E, with the train-pipe and the other part is connected, by means of the pipe E', with the atmosphere.

The tripping device (shown in Figs. 11 and 12) is transportable and independent of the usual signals and is intended to serve on occasion as a substitute for a semaphore-signal or other signal. It consists of two frames P P', connected together by hinges $p$ and adapted to be adjusted to each other at a predetermined angle. This apparatus is intended to be placed on the track at any desired point where there is no permanent signal.

The operation of the whole apparatus is, briefly, as follows: When the bar G is controlled in conjunction with a semaphore-signal, it is moved into its operative position simultaneously with the setting of the signal at "danger," in which position it projects a little above the level of the rails N. On the passing of a train the air-brake-operating lever on the engine is actuated by coming in contact with this bar and rotated through an angle of ninety degrees, thus opening the valve $b'$, so that the brakes are applied. To release the brakes, all that is necessary is to withdraw the pawl $a$ from the notch $o$ in the sector, whereupon the latter is brought back into its normal position by the spring C' acting upon the T-shaped slide C and the valve $b'$ is closed.

The transportable tripping device, Figs. 11 and 12, is intended to be mounted on two adjoining sleepers M. The hinge-plates $p$ correspond to the bar G and like it must project a little above the level of the rails, so that on the passing of a train they trip the air-brake-operating lever, and thus cause the brakes to be applied.

Having now particularly described and ascertained the nature of my said invention and in what manner the same is to be performed, I declare that what I claim is—

1. In apparatus for automatically operating air-brakes on railway-trains from the track, a transportable tripping device, independent of the signals, consisting of two frames connected together by hinge-plates which act as a trip-bar, substantially as described with reference to Figs. 11 and 12 of the accompanying drawings.

2. In apparatus for automatically operating air-brakes on railway-trains from the track, stop-valve mechanism for controlling the air-brake, consisting of a rotatable circular disk having several apertures, which disk is pressed by a spring against a fixed disk, in which corresponding apertures are formed, and is mounted on the same spindle with the striking-lever which projects from the engine.

In witness whereof I have hereunto signed my name, this 16th day of October, 1905, in the presence of two subscribing witnesses.

ADOLPH ANDREJEWITSCH OSOLING.

Witnesses:
TNJENEU P. TADAKOFF,
ADOLPH FRAUWITSCH MONETEIN.